United States Patent

[11] 3,604,257

| [72] | Inventor | Irving Serlin |
| | | 94 Hadley St., Springfield, Mass. 01118 |
| [21] | Appl. No. | 795,734 |
| [22] | Filed | Jan. 31, 1969 |
| [45] | Patented | Sept. 14, 1971 |

[54] METHOD OF TESTING AND SELECTING GLASS CLOTH FOR USE IN POLYIMIDE COMPOSITES
12 Claims, No Drawings

[52] U.S. Cl. .................................................. 73/159, 156/64, 161/93
[51] Int. Cl. ........................................ G01h 33/36
[50] Field of Search........................................... 73/432, 159; 161/93; 156/64

[56] References Cited
UNITED STATES PATENTS

| 2,855,098 | 10/1958 | Jameson et al. ............... | 73/432 X |
| 2,666,720 | 1/1954 | Balz............................... | 73/432 X |
| 3,459,506 | 8/1969 | Finucane...................... | 73/159 |

*Primary Examiner*—S. Clement Swisher
*Attorneys*—William J. Farrington, Arthur E. Hoffman and H. B. Roberts ABSTRACT: A method for the testing and selecting of glass cloth suitable for use in the preparation of polyimide resin impregnated composites. The method comprises determining the extractable polyol content of the glass cloth and then selecting glass cloth having an extractable polyol content of from 0.60 to 0.90 percent by weight based on the weight of the glass cloth for use in the preparation of the polyimide resin impregnated composite.

METHOD OF TESTING AND SELECTING GLASS CLOTH FOR USE IN POLYIMIDE COMPOSITES

BACKGROUND OF THE INVENTION

1. Field of the Invention

The present invention relates to a method for the testing and selection of glass cloth used in the preparation of resin impregnated composites.

More particularly, the present invention relates to a method for the testing and selection of glass cloth which is to be impregnated with a polyimide forming resin and fabricated into a polyimide composite.

2. Description of the Prior Art

The use of glass cloth as a reinforcing element in polyimide resin impregnated composites is well known to those skilled in the art. The glass cloth is commonly impregnated with polyamide acids or polyimide forming varnishes and then fabricated into composites which are used in many varied applications. Laminates which are properly prepared, have good structural strength and are widely used in many varied applications. These laminates find widespread use in the aeronautical and aerospace industries as structural components in aircraft and space vehicles.

The glass cloth used in the preparation of polyimide composites or laminates is conventionally treated with a coupling agent or finish which enhances bondability of the resin to the glass fabric and improves the water resistance of the final laminate. One such class of coupling agents or finishes which are used widely in the treatment of glass cloth are the amino silane compounds which may be generally represented as follows:

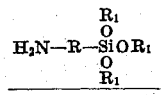

wherein R is selected from the group consisting of alkyl of from 1 to 10 carbon atoms; aryl of from 6 to 16 carbon atoms; and alkaryl of from 7 to 24 carbon atoms wherein the alkyl groups contain from 1 to 4 carbon atoms; and wherein $R_1$ is selected from the group consisting of alkyl of from 1 to 8 carbon atoms; aryl of from 6 to 16 carbon atoms; and alkaryl of from 7 to 24 carbon atoms wherein the alkyl groups contain from 1 to 4 carbon atoms.

Examples of the foregoing compounds would include amino methyl trimethoxy silane; amino methyl triethoxy silane; amino methyl tripropyloxy silane; amino methyl triphenoxy silane; amino methyl tritolyloxy silane; amino ethyl trimethoxy silane; amino ethyl triethoxy silane; amino ethyl tripropyloxy silane; amino ethyl triphenoxy silane; amino propyl trimethoxy silane; amino propyl triethoxy silane; amino propyl tripropyloxy silane; amino phenyl triethoxy silane; amino phenyl triphenoxy silane; amino tolyl triethoxy silane; amino tolyl triphenoxy silane; etc.

The amino silane finish is applied to the glass cloth from a bath which comprises a dilute aqueous solution of the amino silane and a polyol such as glycerine; ethylene glycol; diethylene glycol; triethylene glycol; propylene glycol; dipropylene glycol; 2-ethyl-2-butyl-1,3-propanediol; 2,2-diethyl-1,3-propanediol; 2-ethyl-1,3-hexanediol; hexylene glycol; thiodiglycol; 1,5-pentanediol; 1,2,6-hexanetriol; etc. The preferred polyol is glycerine.

After being coated with the amino silane/polyol solution the cloth is then heat cured in order to bake the finish onto the cloth.

Conventionally, the bath will contain from about 1 to 3 percent by weight of the amino silane and 1 to 3 percent by weight of the polyol, based on the weight of the total solution. However, lesser or greater amounts of amino silane and polyol may be used.

Variations in the concentration of the amino silane/polyol components in the bath, as well as variations in roll speeds during the dipping and curing operations and variations in curing temperatures gives rise to variations in the cloth which may not be apparent upon visual examination of the finished cloth.

These variations in the finished cloth have given rise to some serious problems, especially in cloth used in the preparation of polyimide resin impregnated composites. One of the major problems in this area is the inconsistent performance of these composites after prolonged exposure to elevated temperatures. Certain structural laminates prepared from glass cloth impregnated with a polyimide forming resin are found to have excellent flexural strength after aging for 100 hours at 700° F. while apparently similar composites have significantly lower flexural strength and may even delaminate and fail during the aging periods.

This inconsistent performance has created many problems for polyimide composite manufacturers and end users who are faced with the difficult task of preparing polyimide resin impregnated glass cloth composites for use in critical applications which require prolonged exposure at elevated temperatures.

Moreover, in view of the fact that these composites find widespread use in aeronautical and aerospace applications where a high degree of performance after prolonged periods of exposure at elevated temperatures is a critical necessity, it is of the utmost importance to insure that the polyimide composites which are used in these applications will give the required performance.

The present invention solves some of the problems encountered in the polyimide resin impregnated glass composite art by providing a method for the testing of glass cloth in order to select glass cloth suitable for use in the fabrication of polyimide composites which are to be subject to elevated temperatures for prolonged periods of time. The present invention provides a testing and selection procedure which helps to minimize the incidence of failure of the composite during prolonged exposure at high temperatures and helps to maximize the probability of selecting materials which give the optimum performance.

SUMMARY OF THE INVENTION

The present invention is directed to a method for the testing and selecting of glass cloth suitable for use in the preparation of polyimide resin impregnated composites. The method comprises determining the extractable polyol content of the glass cloth and then selecting glass cloth having an extractable polyol content of from 0.60 to 0.90 percent by weight based on the weight of the glass cloth for use in the preparation of the polyimide resin impregnated composite.

The present invention solves problems previously existent in the prior art by providing a method for the testing and selection of glass cloth for use in polyimide composites which would minimize the incidence of failure of the composite during prolonged exposure at high temperatures and which would maximize the probability of selecting glass cloth which would give optimum performance.

The present invention also provides a greater safety factor by providing a method for the selection of glass cloth with the optimum properties required in a polyimide composite on a more systematic basis. Furthermore, the present invention allows significant time and cost savings in the testing and evaluation of polyimide composites by excluding unsuitable materials early in the testing and evaluation process.

It is an object of this invention to provide a method for the testing and selection of glass cloth used in polyimide resin impregnated composites.

It is a further object of this invention to provide polyimide resin impregnated glass cloth which has been prepared from glass cloth tested and selected according to the methods disclosed herein.

DESCRIPTION OF THE PREFERRED EMBODIMENTS

The foregoing and other objects are obtained by a method for the testing of glass cloth, which has been previously treated with an amino silane-polyol finish, in order to select glass cloth suitable for use in polyimide resin impregnated composites which method comprises:

1. selecting a representative sample of the glass cloth to be tested;
2. extracting the polyol from the glass cloth;
3. determining the amount of polyol extracted; and then
4. selecting glass cloth with an extractable polyol content of from 0.60 percent to 0.90 percent by weight based on the weight of the glass cloth for use in the preparation of the polyimide composite.

The polyol component is extracted from the glass cloth by conventional solvent extraction means. These would include Soxhlet type extractions, repeated extraction washings in a container followed by decantation or centrifuging, distilling the polyol from the glass cloth using elevated temperatures and reduced pressures, etc. The preferred method is Soxhlet type extractions.

The extraction liquids used are those liquids which are solvents for the polyols used in the glass cloth finishing baths. Preferably, the extraction liquid is a nonsolvent for the aminosilane resins used in these baths. These extraction liquids would include water; aliphatic alcohols containing from 1 to 6 carbon atoms such as methanol, ethanol, propanol, butanol, pentanol and hexanol; ethers such as diethyl ether; aromatic aromatic and aliphatic hydrocarbons, etc. The preferred class of extraction liquids are the lower aliphatic alcohols.

The extraction process may be carried out over a wide range of temperatures. Temperatures from 20° C. up to the boiling point of the extraction liquid are preferred. Optionally, pressure vessels may be used to obtain temperatures above the boiling point of the extraction liquid.

After the extraction process the amount of polyol extracted is determined by conventional means. In one method the extraction solvent is evaporated and the polyol residue is weighed and the polyol extractable content of the cloth is calculated. In another method an aliquot of the concentrated extraction liquid is examined with an infra-red spectrophotometer and the IR spectrum is used to calculate the amount of polyol extracted. In still another method the amount of polyol extracted is determined from the specific gravity of the extraction solution which in turn is used to calculate the polyol extractable content of the cloth.

Many other methods can be used to determine the extractable polyol content which will become readily apparent to those skilled in the art.

After the polyol extractable determination, glass cloth with an extractable polyol content of from 0.60 percent to 0.90 percent by weight, based on the weight of the glass cloth, is selected for use in the preparation of the polyimide composite.

Polyimide composites made from glass cloth with a polyol extractable content of less than 0.60 percent are found to have flexural strengths after aging for prolonged periods of time at elevated temperatures, which are decidedly inferior to similar composites made with glass cloth having a polyol extractable content in the specified range of from 0.60 to 0.90 percent.

On the other hand, polyimide composites prepared using glass cloth with a polyol extractable content greater than 0.90 percent are found to be very susceptible to delamination and failure during prolonged aging at elevated temperatures.

The following examples are set forth in illustration of this invention and should not be construed as limitations thereof. Unless otherwise indicated, all parts and percentages given are by weight.

EXAMPLES 1 to 5

In the following examples various lots of a commercially available glass cloth which has been treated with a gamma-aminopropyl triethoxy silane/glycerine finish are used. The glass cloth is further identified as Style 181E-A1100 (soft). The expression "Style 181" designates the weave while the expression "E" designates that the cloth is electrical grade. The expression "A1100" denotes that a gamma aminopropyl triethoxy silane finish was used while the expression "(soft)" indicates that the cloth was intended to have a soft hand or drape.

Representative 10 by 10 inch samples of the cloth are cut from the various lots which are designated as Lots A to E. These samples are then cut into 10 gram samples, placed into the thimble of a Soxhlet apparatus and extracted with methanol for 16 hours. The methanol is evaporated and the residue is weighed, then examined by Infrared spectrophotometry. The IR spectrum shows the extract to be glycerine. The extractable glycerine content of the cloth is then calculated. The results of this calculation are tabulated in Table One below.

TABLE ONE

Extractable Glycerine Content of Lots A to E Glass Cloth

| Lot | % Extractable Glycerine |
| --- | --- |
| A | 0.54 |
| B | 0.66 |
| C | 0.73 |
| D | 0.83 |
| E | 0.95 |

Additional pieces of glass cloth are then cut from Lots A to E and impregnated with a polyimide forming varnish which is a 60 percent solids N-methyl pyrrolidone solution of equimolar amounts of the diethyl ester of benzophenone tetracarboxylic acid and meta-phenylene diamine. The varnish is prepared according to the general teaching of U.S. Pat. No. 3,347,808.

Laminates are prepared by dipping panels of the glass cloth into the polyimide forming varnish, passing the treated cloth through squeeze rollers and then maintaining them on racks in a forced draft air oven at 120° C. (248° F.) for 90 minutes. This B-staged impregnated cloth has a resin content of about 43 percent 200° volatiles 225°of about 250°6.8 300°Four inch squares 372°this impregnated cloth are laid up into a 12 ply laminate which is pressed for 1 hour at 316° C. and 250 p.s.i.

The laminates are post-cured by heating for 4 hour periods at each of the following temperatures: 200° C., 225° C., 250° C., 300° C., and 372° C. The laminates are then cut into 1×4 inch test specimens which are aged for 100 hours at 700° F. Duplicate test specimens are tested for flexural strength according to ASTM procedure D-790.

The results of these tests are tabulated in the following Table Two.

TABLE TWO

Flexural Tests On Laminates Prepared From Lots A To E Glass Cloth

| Example | Lot | % Extractable Glycerine | Flexural Strength (p.s.i) After Aging 100 Hours at 700° F. |
| --- | --- | --- | --- |
| 1 | A | 0.54 | 8,000 |
| 2 | B | 0.66 | 15,000 |
| 3 | C | 0.73 | 28,000 |
| 4 | D | 0.83 | 25,500 |
| 5 | E | 0.95 | Sample failure due to delamination |

The data in the foregoing Table Two indicates the superior flexural aging strength that is obtained when using glass cloth having an extractable glycerine content in the range of from 0.60 to 0.90 percent.

Note that the laminates of Example 1 which was prepared using a glass cloth with an extractable glycerine content of 0.54 percent, had a flexural strength of only 8,000 p.s.i. On the other hand, the laminates prepared from glass cloth with an extractable glycerine content of from 0.60 to 0.90 percent had flexural strengths far in excess of those obtained in Example 1.

Note that the laminates of Example 5 which were prepared with a glass cloth having an extractable glycerine content in excess of the 0.90 percent maximum in the specified range, delaminated during the aging of the laminates.

From the foregoing it should be apparent that the trial and error methods used in the prior art for selection of glass cloth for use in polyimide impregnated composites have led to considerable expense and inefficiency. Because of these inadequate methods expensive laminate preparation, long exposure times, and extensive destructive testing were required in order to determine if a given lot of glass cloth was suitable for the preparation of polymide composites which would be exposed to high temperatures for prolonged periods of time.

Now by virtue of the discovery of the present invention it is possible to test glass cloth and make a proper selection for the use in polyimide composites without resorting to drawnout expensive procedures heretofore used in the prior art.

The preferred polyimide impregnating resins used with the glass cloth tested and selected in accordance with the practice of the present invention are polyamic acids and polyimide forming varnishes which are prepared using (1) an aromatic polycarboxylic component containing from three to four carboxylic groups per molecule, and (2) an aromatic polyamino compound containing at least two primary amino groups per molecule. These materials are well known to those skilled in the art and are described at length in many U.S. Pat. Nos. such as 3,190,856; 3,347,808; 3,179,614; 3,179,633 and 3,179,634 which are incorporated herein by reference.

The especially preferred impregnating materials are polyimide forming varnishes which comprise a dialkyl ester of benzophenone tetracarboxylic acid and an aromatic diamine. These varnishes are described in detail in U.S. Pat. No. 3,347,808.

Obviously, many modifications and variations are possible in the light of the above teachings. It is therefore to be understood that, within the scope of the appended claims, the invention may be practiced otherwise than as specifically described.

What is claimed is:

1. A method for the testing of glass cloth, which has been previously treated with an amino silane-polyol finish, in order to select glass cloth suitable for use in polyimide resin-glass cloth composites which method comprises:
   1. selecting a representative sample of the glass cloth to be tested;
   2. extracting the polyol from the sample of glass cloth;
   3. determining the amount of polyol extracted; and then
   4. approving glass cloth with an extractable polyol content of from 0.60 to 0.90 percent by weight based on the weight of the glass cloth for use in the preparation of the polyimide composite.

2. A method as in claim 1 wherein the polyol is extracted using a Soxhlet extraction apparatus and an organic solvent extraction liquid.

3. A method as in claim 2 wherein the organic solvent is a lower aliphatic alcohol.

4. A method as in claim 3 wherein the lower aliphatic alcohol is methanol.

5. A method as in claim 3 wherein the organic solvent is ethanol.

6. A method for the testing of glass cloth, which has been previously treated with an amino propyl triethoxy silane-glycerine finish, in order to select glass cloth suitable for use in polyimide resin-glass cloth composites which method comprises:
   1. selecting a representative sample of the glass cloth to be tested;
   2. extracting the glycerine from the sample of glass cloth;
   3. determining the amount of glycerine extracted, and then
   4. approving glass cloth with an extractable glycerine content of from 0.60 to 0.90 percent by weight based on the weight of the glass cloth for use in the preparation of the polyimide composite.

7. A method as in claim 6 wherein the glycerine is extracted using a Soxhlet extraction apparatus and an organic solvent extraction liquid.

8. A method as in claim 7 wherein the organic solvent is a lower aliphatic alcohol.

9. A method as in claim 8 wherein the lower aliphatic alcohol is methanol.

10. A method as in claim 8 wherein the lower aliphatic alcohol is ethanol.

11. In the method for the preparation of polyimide composites comprising glass cloth impregnated with a polyimide resin wherein the glass cloth has been treated with an aminopropyl triethoxy silane-glycerine finish prior to the preparation of the composite, the improvement which comprises:
   1. selecting a representative sample of the glass cloth to be tested;
   2. extracting the glycerine from the sample of glass cloth;
   3. determining the extractable glycerine content of the sample of glass cloth; and
   4. approving glass cloth with an extractable glycerine content in the range of from 0.60 percent to 0.90 percent by weight based on the weight of the glass cloth for use in the preparation of the polyimide composite.

12. The improved method of claim 11 wherein the extractable glycerine content of the cloth is determined by a Soxhlet extraction with methanol.

PO-1050
(5/69)

UNITED STATES PATENT OFFICE
CERTIFICATE OF CORRECTION

Patent No. 3,604,257                    Dated September 14, 1971

Inventor(s)  Irving Serlin

It is certified that error appears in the above-identified patent and that said Letters Patent are hereby corrected as shown below:

Column 4, line 47, delete "200° volatiles 225° of about 250° 6.8 300°" and insert therefor - - - and a volatiles content of about 6.8 percent - - -.

Column 4, line 48, delete "372°" and insert therefor - - - of - - -.

Signed and sealed this 29th day of February 1972.

(SEAL)
Attest:

EDWARD M. FLETCHER, JR.                ROBERT GOTTSCHALK
Attesting Officer                      Commissioner of Patents

UNITED STATES PATENT OFFICE
CERTIFICATE OF CORRECTION

Patent No. 3,604,257      Dated September 14, 1971

Inventor(s) Irving Serlin

It is certified that error appears in the above-identified patent and that said Letters Patent are hereby corrected as shown below:

On page 1, column 1, insert --- [73] Assignee Monsanto Company, St. Louis, Mo.

Signed and Sealed this

Twenty-fourth Day of August 1976

[SEAL]

Attest:

RUTH C. MASON  
*Attesting Officer*

C. MARSHALL DANN  
*Commissioner of Patents and Trademarks*